US012059888B2

(12) United States Patent
Takeuchi et al.

(10) Patent No.: US 12,059,888 B2
(45) Date of Patent: Aug. 13, 2024

(54) INK JET RECORDING METHOD AND METHOD OF PACKAGING PACKAGED OBJECT

(71) Applicant: SEIKO EPSON CORPORATION, Tokyo (JP)

(72) Inventors: Emi Takeuchi, Shiojiri (JP); Chigusa Sato, Matsumoto (JP)

(73) Assignee: SEIKO EPSON CORPORATION (JP)

(*) Notice: Subject to any disclaimer, the term of this patent is extended or adjusted under 35 U.S.C. 154(b) by 160 days.

(21) Appl. No.: 17/896,133

(22) Filed: Aug. 26, 2022

(65) Prior Publication Data

US 2023/0080685 A1 Mar. 16, 2023

(30) Foreign Application Priority Data

Aug. 27, 2021 (JP) ................................ 2021-138672

(51) Int. Cl.
*B41J 11/00* (2006.01)

(52) U.S. Cl.
CPC .......... *B41J 11/00212* (2021.01); *B41J 11/00* (2013.01)

(58) Field of Classification Search
CPC ........... B41J 11/00; B41J 2/01; C09D 11/322; C09D 11/00; C09D 11/101; B41M 7/00; B32B 38/14
See application file for complete search history.

(56) References Cited

U.S. PATENT DOCUMENTS 6,495,224 B1 * 12/2002 Dutton ................ B29C 61/0616 427/372.2
6,554,414 B2 * 4/2003 Ylitalo ....................... B41J 2/17 347/102
8,857,961 B2 * 10/2014 Lugassi ................ C09D 11/101 347/100
9,126,431 B2 * 9/2015 Kagose ................ C09D 11/322
2004/0104989 A1 * 6/2004 Hoshino ............ B41J 11/00218 347/102
2004/0114017 A1 * 6/2004 Yokoyama ......... B41J 11/00214 347/102
2005/0128274 A1 6/2005 Matsushima et al.
2009/0139891 A1 * 6/2009 Oshima ................. B32B 38/145 428/32.22
2018/0304525 A1 * 10/2018 Yoshida .................. B32B 27/36
2021/0002499 A1 * 1/2021 Sato ...................... C09D 11/101
2021/0371685 A1 * 12/2021 Sato ...................... B41M 5/0023

FOREIGN PATENT DOCUMENTS

WO 2003-057488 A1 7/2003

* cited by examiner

*Primary Examiner* — John Zimmermann
(74) *Attorney, Agent, or Firm* — Harness, Dickey & Pierce, P.L.C.

(57) ABSTRACT

An ink jet recording method is a method including a jetting step of jetting a radiation-curable ink jet composition to adhere to a recording medium that shrinks when heated, and a curing step of curing the radiation-curable ink jet composition by irradiating the radiation-curable ink jet composition adhered to the recording medium with radiation, in which the recorded material has a first region and a second region where shrinkage ratios due to the heating in a main surface direction are different when the recorded material is shrunk by being heated and brought into close contact with a packaged object, the shrinkage ratio of the first region in the main surface direction is greater than the shrinkage ratio of the second region in the main surface direction, and the radiation-curable ink jet composition adheres to the recording medium such that a film thickness of a cured film formed in the first region is less than a film thickness of a cured film formed in the second region.

6 Claims, No Drawings

INK JET RECORDING METHOD AND METHOD OF PACKAGING PACKAGED OBJECT

The present application is based on, and claims priority from JP Application Serial Number 2021-138672, filed Aug. 27, 2021, the disclosure of which is hereby incorporated by reference herein in its entirety.

BACKGROUND

1. Technical Field

The present disclosure relates to an ink jet recording method and a method of packaging a packaged object.

2. Related Art

An ink jet recording method enables recording of high-definition images with a relatively simple device, and is thus rapidly developing in various fields. For example, WO2003/57488A describes an ink jet printer that performs recording by jetting UV ink to be cured by irradiation with ultraviolet rays to a resin base material serving as a recording medium or a shrink film that shrinks when heated and irradiating the recording medium with ultraviolet rays. The shrink film shrinks when heated and thus can be brought into close contact with the outer shape of a packaged object such as a container. The shrink film has been widely used for the purpose of packaging a product or the like, by recording an image or the like on the shrink film and heating the recorded material so that the recorded material is shrunk.

However, the dimensions of the outer shape of the packaged object are not constant in some cases, for example, when the packaged object such as a container has roughness. In such a case, the shrinkage ratio of the shrink film varies depending on the position on the film. Further, when the shrink film is shrunk, the image formed on the shrink film is also shrunk due to the shrinkage of the shrink film, and thus there is a problem in that in a case where an ink coating film with an identical film thickness is formed to express an identical color, the color of the image formed in a portion of the shrink film with a higher shrinkage ratio is darker than the color of the image formed in a portion of the shrink film with a lower shrinkage ratio. That is, there has been a demand for an ink jet recording method in which a difference in color of an image between before and after shrinkage is inconspicuous, in consideration of the shrinkage ratio of the shrink film.

SUMMARY

According to an aspect of the present disclosure, there is provided an ink jet recording method including a jetting step of jetting a radiation-curable ink jet composition containing a coloring material and a polymerizable composition to adhere to a recording medium that shrinks when heated, and a curing step of curing the radiation-curable ink jet composition by irradiating the radiation-curable ink jet composition adhered to the recording medium with radiation, to obtain a recorded material, in which the recorded material has a first region and a second region where shrinkage ratios due to the heating in a main surface direction are different when the recorded material is shrunk by being heated and brought into close contact with a packaged object, the shrinkage ratio of the first region in the main surface direction is greater than the shrinkage ratio of the second region in the main surface direction, and the radiation-curable ink jet composition adheres to the recording medium in the jetting step such that a film thickness of a cured film formed in the first region is less than a film thickness of a cured film formed in the second region.

According to another aspect of the present disclosure, there is provided a method of packaging a packaged object, including disposing the recorded material obtained by the ink jet recording method in a periphery of a packaged object, and heating the recorded material to shrink the recorded material.

DESCRIPTION OF EXEMPLARY EMBODIMENTS

1. Radiation-Curable Ink Jet Composition

A radiation-curable ink jet composition used for an ink jet recording method will be described before description of the ink jet recording method of the present embodiment.

The radiation-curable ink jet composition is an ink jet composition that is cured by being irradiated with radiation. Further, in the specification below, the radiation-curable ink jet composition will also be simply referred to as "ink composition". Examples of the radiation include ultraviolet rays, electron beams, infrared rays, visible light, and X-rays. Among these, from the viewpoint that radiation sources are available and widely used and that materials suitable for being cured by irradiation with ultraviolet rays are also available and widely used, ultraviolet rays are preferable as the radiation.

The ink composition contains a coloring material and a polymerizable compound.

1.1. Coloring Material

The ink composition contains a coloring material. The coloring material contained in the ink composition is not particularly limited, but a non-white coloring material is preferable. The non-white coloring material denotes a coloring material of a color other than white, and examples thereof include colored coloring materials and black coloring materials. As the non-white coloring material, at least one of a pigment or a dye can be used.

The light resistance of the ink composition can be improved by using a pigment as the coloring material. Both an inorganic pigment and an organic pigment can be used as the pigment.

Examples of the inorganic pigment include carbon blacks (C.I. (Colour Index Generic Name) Pigment Black 7) such as furnace black, lamp black, acetylene black, and channel black, and iron oxide.

Examples of the organic pigment include an azo pigment such as an insoluble azo pigment, a condensed azo pigment, Azo Lake, or a chelate azo pigment, a polycyclic pigment such as a phthalocyanine pigment, a perylene pigment, a perinone pigment, an anthraquinone pigment, a quinacridone pigment, a dioxane pigment, a thioindigo pigment, an isoindolinone pigment, or a quinophthalone pigment, a chelate dye (such as a basic dye-type chelate or an acidic dye-type chelate), a lake dye (such as a basic dye-type lake or an acidic dye-type lake), a nitro pigment, a nitroso pigment, aniline black, and a daylight fluorescent pigment.

Examples of a pigment used in a yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

Examples of a pigment used in a magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, and C.I. Pigment Violet 19, 23, 32, 33, 36, 38, 43, and 50.

Examples of a pigment used in a cyan ink include C.I. Pigment Blue 1, 2, 3, 15, 15:1, 15:2, 15:3, 15:34, 15:4, 16, 18, 22, 25, 60, 65, and 66, and C.I. Vat Blue 4 and 60.

Further, examples of a pigment of a color other than magenta, cyan, and yellow include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

Examples of a pigment used in a black ink include No. 2300, No. 900, MCF88, No. 33, No. 40, No. 45, No. 52, MA7, MA8, MA100, and No. 2200B (all manufactured by Mitsubishi Chemical Corporation), Raven (registered trademark) 5750, Raven 5250, Raven 5000, Raven 3500, Raven 1255, and Raven 700 (all manufactured by Columbia Carbon), Regal 400R, Regal 330R, Regal 660R, Mogul (registered trademark) L, Monarch (registered trademark) 700, Monarch 800, Monarch 880, Monarch 900, Monarch 1000, Monarch 1100, Monarch 1300, and Monarch 1400 (all manufactured by Cabot Corporation), and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (all manufactured by Degussa-Huls AG).

The pigment can be used in a state of a pigment dispersion liquid, and a dispersant can be used as necessary. The dispersant is not particularly limited, and examples thereof include dispersants that are commonly used to prepare a pigment dispersion liquid, such as a polymer dispersant. Specific examples thereof include dispersants containing, as main components, one or more of polyoxyalkylene polyalkylene polyamine, a vinyl-based polymer, a vinyl-based copolymer, an acrylic polymer, an acrylic copolymer, polyester, polyamide, polyimide, polyurethane, an amino-based polymer, a silicon-containing polymer, a sulfur-containing polymer, a fluorine-containing polymer, and an epoxy resin. The dispersant may be used alone or in a combination of two or more kinds thereof.

Examples of commercially available products of the polymer dispersant include AJISPER (registered trademark) Series (manufactured by Ajinomoto Fine-Techno Co., Ltd.), Solsperse Series (such as Solsperse (registered trademark) 36000, manufactured by Lubrizol Corporation), DISPERBYK Series (manufactured by BYK Additives & Instruments GmbH), and DISPARLON (registered trademark) Series (manufactured by Kusumoto Chemicals, Ltd.).

The content of the dispersant is preferably in a range of 0.1% to 2.0% by mass, more preferably in a range of 0.1% to 1.0% by mass, and still more preferably in a range of 0.1% to 0.5% by mass with respect to the total mass of the ink.

When a dye is used as the coloring material, the dye is not particularly limited, and examples thereof include an acidic dye, a direct dye, a reactive dye, and a basic dye. Examples of the dye include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The dye may be used alone or in a combination of two or more kinds thereof.

A white pigment may be used as the coloring material. The white pigment used in the ink composition is not particularly limited, and examples thereof include white inorganic pigments such as titanium oxide, zinc oxide, zinc sulfide, antimony oxide, magnesium oxide, and zirconium oxide. In addition to the white inorganic pigments, white organic pigments such as white hollow resin fine particles and polymer particles may be used.

The content of the coloring material in the ink composition is preferably in a range of 0.2% by mass to 20.0% by mass, more preferably in a range of 0.5% by mass to 15.0% by mass, and still more preferably in a range of 1.0% by mass to 10.0% by mass with respect to the total mass of the ink composition.

1.2. Polymerizable Compound

The ink composition contains a polymerizable compound. It is preferable that the ink composition contain a monofunctional monomer as the polymerizable compound.

1.2.1. Monofunctional Monomer

The content of the monofunctional monomer is preferably 35% by mass or greater and 90% by mass or less, more preferably 40% by mass or greater and 85% by mass or less, and still more preferably 50% by mass or greater and 80% by mass or less with respect to the total mass of the polymerizable compound contained in the ink composition.

When the content of the monofunctional monomer is in the above-described ranges, a flexible cured film can be obtained, and thus the adhesiveness of the cured film to the recording medium is enhanced. In this manner, cracking of the cured film is unlikely to occur when the recorded material is shrunk by being heated. Further, when the recorded material is shrunk by being heated and the recorded surface of the recorded material is brought into close contact with the packaged object, blocking of the cured film to the packaged object can be suppressed.

The monofunctional monomer is not particularly limited, and examples thereof include a monofunctional monomer containing an alicyclic group, a monofunctional monomer containing an aromatic group, and a monofunctional monomer containing a nitrogen-containing heterocyclic ring. Further, a monofunctional monomer other than those described above may be used as the monofunctional monomer.

1.2.1.1. Monofunctional Monomer Containing Alicyclic Group

The monofunctional monomer containing an alicyclic group is not particularly limited, and examples thereof include an alicyclic group-containing (meth)acrylate such as dicyclopentenyl (meth)acrylate, dicyclopentenyloxyethyl (meth)acrylate, dicyclopentanyl (meth)acrylate, 3,3,5-trimethylcyclohexyl (meth)acrylate, isobornyl (meth)acrylate, tert-butylcyclohexanol (meth)acrylate, or 2-(meth)acrylic acid-1,4-dioxaspiro[4,5]dec-2-ylmethyl.

Among these, dicyclopentenyl (meth)acrylate (DCPA) or isobornyl acrylate (IBXA) is preferable.

1.2.1.2. Monofunctional Monomer Containing Aromatic Group

The monofunctional monomer containing an aromatic group is not particularly limited, and examples thereof include phenoxyethyl (meth)acrylate, benzyl (meth)acrylate, alkoxylated 2-phenoxyethyl (meth)acrylate, ethoxylated nonylphenyl (meth)acrylate, alkoxylated nonylphenyl (meth)acrylate, p-cumylphenol EO-modified (meth)acrylate, and 2-hydroxy-3-phenoxypropyl (meth)acrylate.

Among these, phenoxyethyl acrylate (PEA) is preferable. The solubility of a photopolymerization initiator and the curability of the ink composition are further improved by using such an aromatic group-containing monofunctional monomer. Further, the solubility of the photopolymerization initiator is further enhanced when using an acylphosphine oxide-based photopolymerization initiator or a thioxanthone-based photopolymerization initiator.

1.2.1.3. Nitrogen-Containing Monofunctional Monomer

The nitrogen-containing monofunctional monomer is not particularly limited, and examples thereof include a nitrogen-containing monofunctional vinyl monomer such as N-vinylcaprolactam, N-vinylformamide, N-vinylcarbozole, N-vinylacetamide, vinyl methyl oxazolidinone, or N-vinylpyrrolidone, a nitrogen-containing monofunctional acrylate monomer such as acryloyl morpholine, and a nitrogen-containing monofunctional acrylamide monomer such as (meth)acrylamide, N-hydroxymethyl (meth)acrylamide, diacetone acrylamide, N,N-dimethyl(meth)acrylamide, or a (meth)acrylamide of a dimethylaminoethyl acrylate benzyl chloride quaternary salt or the like.

Among these, a monomer having a nitrogen-containing heterocyclic structure such as N-vinylcaprolactam, N-vinylcarbazole, N-vinylpyrrolidone, vinyl methyl oxazolidinone (VMOX), or acryloyl morpholine (ACMO) is more preferable, and acryloyl morpholine is still more preferable.

1.2.2. Polyfunctional Monomer

The ink composition contains a polymerizable compound, and may contain a polyfunctional monomer as the polymerizable compound. The polyfunctional monomer is not particularly limited, and examples thereof include a vinyl group-containing (meth)acrylate and a polyfunctional (meth)acrylate.

1.2.2.1. Vinyl Group-Containing (Meth)Acrylate

The vinyl group-containing (meth)acrylate is not particularly limited, and examples thereof include a compound represented by Formula (1).

$$H_2C{=}CR^1{—}CO{—}OR^2{—}O{—}CH{=}CH{—}R^3 \quad (1)$$

(In the formula, $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms.)

In Formula (1), examples of the divalent organic residue having 2 to 20 carbon atoms as $R^2$ include a linear, branched, or cyclic alkylene group having 2 to 20 carbon atoms which may be substituted, an alkylene group having 2 to 20 carbon atoms which has an oxygen atom via an ether bond and/or an ester bond in the structure and may be substituted, and a divalent aromatic group having 6 to 11 carbon atoms which may be substituted.

Among these, an alkylene group having 2 to 6 carbon atoms such as an ethylene group, an n-propylene group, an isopropylene group, or a butylene group and an alkylene group having 2 to 9 carbon atoms which has an oxygen atom via an ether bond such as an oxyethylene group, an oxy n-propylene group, an oxyisopropylene group, or an oxybutylene group in the structure are preferable. Further, from the viewpoint that the viscosity of the ink can be further decreased and the curability of the ink is further enhanced, a compound having a glycol ether chain, in which $R^2$. represents an alkylene group having 2 to 9 carbon atoms which has an oxygen atom via an ether bond such as an oxyethylene group, an oxy n-propylene group, an oxyisopropylene group, or an oxybutylene group in the structure, is more preferable.

In Formula (1), as the monovalent organic residue having 1 to 11 carbon atoms as $R^3$, a linear, branched, or cyclic alkyl group having 1 to 10 carbon atoms which may be substituted or an aromatic group having 6 to 11 carbon atoms which may be substituted is suitable.

Among these, an alkyl group having 1 or 2 carbon atoms which is a methyl group or an ethyl group or an aromatic group having 6 to 8 carbon atoms such as a phenyl group or a benzyl group is suitably used.

The compound represented by Formula (1) is not particularly limited, and specific examples thereof include 2-(2-vinyloxyethoxy)ethyl (meth)acrylate. Among the examples, 2-(2-vinyloxyethoxy)ethyl acrylate (VEEA) is preferable.

Particularly, it is preferable that the ink composition contain a vinyl group-containing (meth)acrylate represented by Formula (1) as a polyfunctional monomer. In this manner, the curability of the ink composition is further improved.

The content of the vinyl group-containing (meth)acrylate is preferably in a range of 1% by mass to 25% by mass, more preferably in a range of 2% by mass to 20% by mass, and still more preferably in a range of 3% by mass to 15% by mass with respect to the total mass of the polymerizable compound contained in the ink composition. When the content of the vinyl group-containing (meth)acrylate is in the above-described ranges, the ink composition with excellent jetting stability is provided by suppressing an increase in viscosity of the ink composition.

1.2.2.2. Polyfunctional (Meth)Acrylate

The polyfunctional (meth)acrylate is not particularly limited, and examples thereof include bifunctional (meth)acrylate such as dipropylene glycol di(meth)acrylate, diethylene glycol di(meth)acrylate, or triethylene glycol di(meth)acrylate, and a trifunctional or higher polyfunctional (meth)acrylate such as trimethylolpropane tri(meth)acrylate, EO-modified trimethylolpropane tri(meth)acrylate, pentaerythritol tri(meth)acrylate, pentaerythritol tetra(meth)acrylate, or dipentaerythritol hexa(meth)acrylate.

The content of the polyfunctional (meth)acrylate is preferably in a range of 5% by mass to 35% by mass, more preferably in a range of 10% by mass to 30% by mass, and still more preferably in a range of 15% by mass to 25% by mass with respect to the total mass of the polymerizable compound contained in the ink composition. When the content of the polyfunctional (meth)acrylate is in the above-described ranges, the curability and the rub resistance of the ink composition are further improved.

1.3. Photopolymerization Initiator

It is preferable that the ink composition contain a photopolymerization initiator. The photopolymerization initiator is not particularly limited as long as an active species is generated by irradiation with radiation, and examples thereof include known photopolymerization initiators such as an acylphosphine oxide-based photopolymerization initiator, an alkylphenone-based photopolymerization initiator, a titanocene-based photopolymerization initiator, and a thioxanthone-based photopolymerization initiator. Among these, an acylphosphine oxide-based photopolymerization initiator is preferable. The curability of the ink composition is further improved, and particularly the curability obtained by performing the curing process with light of a UV-LED is further improved by using such a photopolymerization initiator. The photopolymerization initiator may be used alone or in a combination of two or more kinds thereof.

The acylphosphine oxide-based photopolymerization initiator is not particularly limited, and examples thereof include 2,4,6-trimethylbenzoyl diphenylphosphine oxide, bis(2,4,6-trimethylbenzoyl)-phenylphosphine oxide, and bis-(2,6-dimethoxybenzoyl)-2,4,4-trimethylpentyl phosphine oxide.

Examples of commercially available products of such an acylphosphine oxide-based photopolymerization initiator include IRGACURE (registered trademark) 819 (bis(2,4,6-trimethylbenzoyl)-phenylphosphine oxide), IRGACURE 1800 (mixture of bis-(2,6-dimethoxybenzoyl)-2,4,4-trimethylpentyl phosphine oxide and 1-hydroxy-cyclohexyl-phenyl ketone at a mass ratio of 25:75), and IRGACURE TPO (2,4,6-trimethylbenzoyl diphenylphosphine oxide) (all manufactured by BASF SE).

The content of the photopolymerization initiator is preferably in a range of 3.0% by mass to 15.0% by mass, more preferably in a range of 5.0% by mass to 13.5% by mass, and still more preferably in a range of 8.0% by mass to 12.0% by mass with respect to the total mass of the ink composition. The curability of the ink composition and the solubility of the photopolymerization initiator are further improved by setting the content of the photopolymerization initiator to be in the above-described ranges.

1.4. Polymerization Inhibitor

The ink composition may contain a polymerization inhibitor. The polymerization inhibitor is not particularly limited to the following examples, and examples thereof include p-methoxyphenol, hydroquinone monomethyl ether (MEHQ), 4-hydroxy-2,2,6,6-tetramethylpiperidine-N-oxyl, hydroquinone, cresol, t-butylcatechol, 3,5-di-t-butyl hydroxytoluene, 2,2'-methylenebis(4-methyl-6-t-butylphenol), 2,2'-methylenebis(4-ethyl-6-butylphenol), 4,4'-thiobis (3-methyl-6-t-butylphenol), and a hindered amine compound. The polymerization inhibitor may be used alone or in a combination of two or more kinds thereof.

The content of the polymerization inhibitor is preferably in a range of 0.05% by mass to 1.00% by mass and more preferably in a range of 0.05% by mass to 0.50% by mass with respect to the total mass of the ink composition.

1.5. Slipping Agent

The ink composition may contain a slipping agent. The slipping agent is used for the purpose of improving the rub resistance of the cured film. As the slipping agent, a silicone-based surfactant is preferable, and polyester-modified silicone or polyether-modified silicone is more preferable.

A commercially available product can be used as the slipping agent, and examples thereof include polyester-modified silicone such as BYK (registered trademark)-347, BYK-348, BYK-UV3500, BYK-UV3510, and BYK-UV3530 (all manufactured by BYK Additives & Instruments GmbH) and polyether-modified silicone such as BYK-3570 (manufactured by BYK Additives & Instruments GmbH). The slipping agent may be used alone or in a combination of two or more kinds thereof.

The content of the slipping agent is preferably in a range of 0.01% by mass to 2.00% by mass and more preferably in a range of 0.05% by mass to 1.00% by mass with respect to the total mass of the ink composition.

1.6. Other Components

Various additives such as a dissolution assistant, a viscosity adjuster, a pH adjuster, an antioxidant, a preservative, a fungicide, a corrosion inhibitor, and a moisturizer that is not an organic solvent can be appropriately added to the ink composition for the purpose of improving the storage stability, satisfactorily maintaining the jetting stability of the ink from the ink jet head, solving clogging, preventing deterioration of the ink composition, or capturing metal ions that affect dispersion.

2. Method of Preparing Ink

The ink composition can be produced by dispersing and mixing the above-described respective components using an appropriate method. When a pigment is used as the coloring material, it is preferable that a pigment, a dispersant, and a part of the polymerizable compound that is a solvent be firstly mixed using an appropriate disperser to prepare a uniform pigment dispersion liquid. Next, components contained in other ink compositions are added thereto, and the solution is sufficiently stirred, thereby preparing an ink solution. The ink solution is sufficiently stirred and filtered to remove coarse particles and foreign matter that cause clogging, thereby obtaining a target ink composition.

3. Ink Jet Device

An ink jet device used for the ink jet recording method according to the present embodiment will be described. A known device such as an ink jet printer can be employed as the ink jet device, and specific examples thereof include an on-carriage type or off-carriage type serial printer and a line head printer.

The ink jet device includes an ink jet head. The ink jet head jets liquid droplets of the ink composition to adhere to a recording medium or the like. Therefore, the ink jet head includes an actuator serving as a driving unit. Examples of the actuator include a piezoelectric element that uses deformation of a piezoelectric substance, an electromechanical conversion element that uses displacement of a vibration plate due to electrostatic adsorption, and a thermoelectric conversion element that uses bubbles generated by heating. In the present embodiment, an ink jet device including an ink jet head provided with a piezoelectric element is employed.

The ink jet device includes a light source device that cures the ink composition adhered to the recording medium. The light source device is a radiation irradiation device and includes a light emitting element such as an ultraviolet light emitting diode (UV-LED). The radiation applied from the light source device is not limited to ultraviolet rays and may be infrared rays, electron beams, visible light, or X-rays. Further, the light source device may include a lamp in place of the light emitting element such as a light emitting diode (LED) or a semiconductor laser (LD). Further, the light source device is not limited to being included in the ink jet device, and may be provided separately from the ink jet device.

The photopolymerization reaction of the polymerizable compound contained in the ink composition proceeds by irradiating the liquid droplets of the ink composition adhered to the recording medium with radiation from the light source device, and thus the liquid droplets of the ink composition are cured, thereby forming a cured film of the ink composition.

4. Recording Medium

The recording medium used in the present embodiment is a recording medium that is shrunk when heated, and specific examples thereof include a plastic film on which a stretching treatment has been performed. That is, the plastic film can be aligned in a tensile direction by being subjected to the stretching treatment, and the aligned plastic film has a property that the film is shrunk to the dimensions before the stretch due to a relaxed stress based on the molecular alignment when the film is heated.

Examples of the plastic film having such a property include a polyolefin film such as a polypropylene film or a polyethylene film, a polyvinyl chloride film, a polystyrene film, and a polyethylene terephthalate film, stretched in a monoaxial direction or a biaxial direction. Among these, a polyolefin film or a polyethylene terephthalate film is preferable. The polyolefin film or the polyethylene terephthalate film can be suitably used as the film that packages a packaged object.

5. Ink Jet Recording Method

An ink jet recording method includes a jetting step of jetting the ink composition containing a coloring material and a polymerizable composition to adhere to a recording medium that shrinks when heated, and a curing step of curing the ink composition by irradiating the ink composition adhered to the recording medium with radiation, to obtain a recorded material. The recorded material has a first region and a second region where shrinkage ratios due to the heating in a main surface direction are different when the recorded material is shrunk by being heated and brought into close contact with a packaged object, and the shrinkage ratio of the first region in the main surface direction is greater than the shrinkage ratio of the second region in the main surface direction. Here, the ink composition adheres to the recording medium in the jetting step such that the film thickness of the cured film formed in the first region is less than the film thickness of a cured film formed in the second region.

5.1. Jetting Step

In the jetting step, the ink composition is jetted from the ink jet head of the ink jet device to adhere to the recording medium. Specifically, the ink composition filling a pressure generation chamber of the ink jet head is jetted from a nozzle by driving a piezoelectric element.

Here, the ink composition adheres to the recording medium such that the film thickness of the cured film formed in the first region between the cured films formed in the curing step which is a post-step is less than the film thickness of the cured film formed in the second region.

The first region and the second region are regions on the recorded material to be obtained by radiating the ink composition adhered to the recording medium with radiation in the curing step. When the recorded material is heated, shrunk, and brought into close contact with the packaged object, the shrinkage ratios of the recorded material due to the heating in the main surface direction are different such that the shrinkage ratio of the first region in the main surface direction is greater than the shrinkage ratio of the second region in the main surface direction.

The film thickness of the cured film denotes a film thickness of the cured film in the recorded material when the printing is performed with a dot generation amount of 100%. Specifically, the film thickness of the cured film can be measured in the following manner. That is, the recorded material is cut using a microtome or the like to prepare a slice sample or a cross-sectional sample, and the film thickness is measured with a microscope. Alternatively, the film thickness is measured using a laser microscope in a non-destructive manner. Any of these operations is performed on five or more sites in the printed region with a dot generation amount of 100% in the recorded material, and the average value of the obtained values is defined as the film thickness of the cured film.

Meanwhile, the film thickness of the cured film is the film thickness of the cured film in the recorded material when the printing is performed with a dot generation amount of 100%, as defined above, but in a case where the dot generation amount is less than 100% or the dot generation amount is greater than 100%, the film thickness of the cured film is a value obtained by multiplying the film thickness of the cured film in the recorded material when the printing is performed with a dot generation amount of 100%, by the dot generation amount.

The reason for this is as described below. In the ink jet recording method, an area gradation method is employed to express an image having a continuous gradation. Therefore, when a certain region is viewed, pixels to which liquid droplets of the ink composition are adhered and pixels to which liquid droplets of the ink composition are not adhered are present in the region where the dot generation amount is less than 100%. Further, a plurality of liquid droplets are adhered to one pixel in the region where the dot generation amount is greater than 100%.

As described above, in the ink jet recording method for which an area gradation method is employed, when the film thickness of the cured film is measured in pixel units, the measured film thickness is a discrete value, which is not appropriate as the film thickness of the cured film. It is appropriate to calculate the average value of the film thicknesses in a certain region and to define this average value as the film thickness of the cured film.

The average value of the film thicknesses in a certain region can be acquired by multiplying the film thickness of the cured film in the recorded material when the printing is performed with a dot generation amount of 100% by the dot generation amount of the region in a case where the film thickness of the cured film in the recorded material when the printing is performed with a dot generation amount of 100% is known.

For example, the film thickness of the cured film in a region where the printing is performed with a dot generation amount of 50% is 5.0 μm when the film thickness of the cured film in the recording material when the printing is performed with a dot generation amount of 100% is 10.0 μm. Similarly, the film thickness of the cured film in a region where the printing is performed with a dot generation amount of 25% is 2.5 μm.

5.2. Curing Step

In the curing step, the ink composition adhered to the recording medium is irradiated with radiation so that the ink composition is cured. When the ink composition is irradiated with radiation, the polymerization reaction of the polymerizable compound contained in the ink composition is started to cure the ink composition so that a cured film is formed. Here, when a photopolymerization initiator is present in the ink composition, an active species (initiation species) such as a radical, an acid, or a base is generated, and the polymerization reaction of the polymerizable compound is promoted by the function of the initiation species.

When the recorded material produced by the method of producing the recorded material is heated and shrunk, the first region of the recorded material is shrunk more than the second region in the main surface direction and brought into close contact with the packaged object. Here, the cured films formed on the recording medium also shrink along with the shrinkage of the recording medium, and the film thickness of the cured film formed in the first region is less than the film thickness of the cured film formed in the second region. Therefore, even when the shrinkage ratio of the first region of the recorded material in the main surface direction is greater than the shrinkage ratio of the second region in the main surface direction, the color of the image of the second region is suppressed from darkening than the color of the image of the first region, and color unevenness of the image after the shrinkage is suppressed from occurring.

That is, when the recorded material is heated, shrunk, and brought into close contact with the packaged object, an effect of suppressing the color of the image of the first region from darkening than the color of the image of the second region and suppressing occurrence of color unevenness of the image after the shrinkage is exhibited.

It is preferable that the film thickness of the cured film formed in the second region is 2 times or less the film thickness of the cured film formed in the first region. In this manner, occurrence of variation in the film thickness of the cured film between the first region and the second region after the shrinkage can be reduced. Further, even when the shrinkage ratio of the first region of the recorded material in the main surface direction is greater than the shrinkage ratio of the second region in the main surface direction, it is possible to more effectively suppress the color of the image of the second region from darkening than the color of the image of the first region.

Further, the maximum film thickness of the cured film is preferably 20 μm or less and more preferably 10 μm or less. When the film thickness of the cured film is set to be in the above-described ranges, it is possible to suitably suppress the cured film from being peeled off from the recording medium and to suitably suppress generation of wrinkles on the cured film in a case where the recorded material is shrunk.

Further, when the recorded material is wound around a roll, thickening of the roll can be suppressed and the storage efficiency of the roll can be improved by setting the film thickness of the cured film to be small.

It is preferable that the ink composition contains a non-white coloring material as the coloring material. According to the method of producing the recorded material of the present disclosure, color unevenness in the image after the shrinkage is suppressed from occurring by forming the cured film of the first region such that the film thickness of the cured film of the first region is less than the film thickness of the cured film of the second region even when the recorded material is heated and shrunk and the first region of the recorded material is shrunk more than the second region in the main surface direction. When the ink composition contains a non-white coloring material as the coloring material, a visual stimulus is great when the color tone of the image is changed due to the shrinkage of the recorded material, as compared with a case where the ink composition does not contain a non-white coloring material, for example, a case where the ink composition contains only a white coloring material as a coloring material or a case where the ink composition does not contain a coloring material at all. That is, in a case where the ink composition contains a non-white coloring material as a coloring material, the effect of the present disclosure of suppressing color unevenness of the image that occurs when the recorded material is shrunk can be significantly exhibited.

6. Step of Packaging Packaged Object

A method of packaging a packaged object includes a step of disposing the recorded material obtained by the ink jet recording method in the periphery of a packaged object and a step of heating the recorded material to shrink the recorded material.

In this manner, when the recorded material is heated and shrunk, the first region of the recorded material is shrunk more than the second region in the main surface direction and brought into close contact with the packaged object. Here, the cured films formed on the recording medium also shrink along with the shrinkage of the recording medium, and the film thickness of the cured film formed in the first region is less than the film thickness of the cured film formed in the second region. Therefore, even when the shrinkage ratio of the first region of the recorded material in the main surface direction is greater than the shrinkage ratio of the second region in the main surface direction, the color of the image of the second region is suppressed from darkening than the color of the image of the first region, and color unevenness of the image after the shrinkage is suppressed from occurring.

The method of disposing the recorded material in the periphery of the packaged object is not particularly limited, and for example, an optional method such as a method of processing the recorded material into a cylindrical shape and winding the recorded material around the packaged object, a method of temporarily fixing the recorded material to the packaged object with an adhesive or the like, a method of covering the packaged object with the recorded material, or a method of placing the recorded material on the packaged object can be employed.

The method of heating the recorded material to shrink the recorded material is not particularly limited. Specifically, an optional method such as a method of put the recorded material and the packaged object in a constant-temperature tank, a method of blowing heated air to the recorded material, or a method of pressing an object heated with a heater or the like against the recorded material can be employed. The packaged object may be preheated before the recorded material is heated.

7. Examples

Hereinafter, the present disclosure will be described in detail based on the following examples and comparative examples. The present disclosure is not limited to the following examples.

7.1. Preparation of Ink Composition

A coloring material, a dispersant, and a part of each polymerizable compound were weighed, put into a tank for dispersing a pigment, and stirred with ceramic beads having a diameter of 1 mm, thereby obtaining a pigment dispersion liquid in which the coloring material had been dispersed in the polymerizable compound.

Next, the remaining polymerizable compound, a photopolymerization initiator, a polymerization inhibitor, and a slipping agent were added to a mixing tank that was a stainless steel container with the composition as listed in Table 1, mixed, and stirred for complete dissolution, the pigment dispersion liquid obtained above was poured into the ink, and the solution was mixed and stirred at room temperature for 1 hour. Thereafter, the solution was filtered by a membrane filter having a pore diameter of 5 μm, thereby obtaining inks 1 to 5. Further, the numerical values of the respective components listed in the table are in units of % by mass.

TABLE 1

| | | | Ink 1 | Ink 2 | Ink 3 | Ink 4 | Ink 5 |
|---|---|---|---|---|---|---|---|
| Coloring material | | P.B.15:3 | 3.0 | 3.0 | 3.0 | 3.0 | 3.0 |
| Dispersant | | Solsperse36000 | 0.2 | 0.2 | 0.2 | 0.2 | 0.2 |
| Polymerizable compound | Monofunctional monomer | IBXA | — | — | — | — | 30.0 |
| | | PEA | 30.0 | 64.0 | 69.0 | 74.0 | 31.0 |
| | | ACMO | — | — | — | — | 15.0 |
| | Polyfunctional monomer | VEEA | 20.0 | — | — | — | 8.0 |
| | | DPGDA | 25.0 | 20.0 | 15.0 | 10.0 | — |
| | | ADPH | 9.0 | — | — | — | — |
| Photopolymerization initiator | | 819 | 5.0 | 5.0 | 5.0 | 5.0 | 5.0 |
| | | TPO | 5.0 | 5.0 | 5.0 | 5.0 | 5.0 |
| | | DETX | 2.0 | 2.0 | 2.0 | 2.0 | 2.0 |
| Polymerization inhibitor | | MEHQ | 0.2 | 0.2 | 0.2 | 0.2 | 0.2 |
| Slipping agent | | BYK UV3500 | 0.5 | 0.5 | 0.5 | 0.5 | 0.5 |
| Total amount | | | 100.0 | 100.0 | 100.0 | 100.0 | 100.0 |
| Content (%) of monofunctional monomer with respect to total mass of polymerizable compound | | | 36 | 76 | 82 | 88 | 90 |

The materials listed in Table 1 are as follows.

<Coloring Material (Pigment)>

Pigment Blue 15:3 (PB15:3)

<Dispersant>

Solsperse 36000 (manufactured by Lubrizol Corporation, polymer dispersant)

<Monofunctional Monomer>

IBXA (manufactured by Osaka Organic Chemical Industry Ltd., isobornyl acrylate)

PEA (trade name, "VISCOAT #192", manufactured by Osaka Organic Chemical Industry Ltd., phenoxyethyl (meth)acrylate)

ACMO (manufactured by KJ Chemicals Corporation, acryloyl morpholine)

<Polyfunctional Monomer>

VEEA (manufactured by Nippon Shokubai Co., Ltd., 2-(2-vinyloxyethoxy) ethyl acrylate)

DPGDA (manufactured by Sartomer, dipropylene glycol diacrylate)

ADPH (manufactured by Shin Nakamura Chemical Industry Co., Ltd., pentaerythritol hexaacrylate)

<Polymerization Initiator>

819 (trade name, "IRGACURE 819", manufactured by BASF SE, bis(2,4,6-trimethylbenzoyl)-phenylphosphine oxide)

TPO (trade name, "IRGACURE TPO", manufactured by BASF SE, 2,4,6-trimethylbenzoyl diphenyl phosphine oxide)

DETX (trade name, "Speedcure DETX", manufactured by Lambson Fine Chemicals Ltd., 2,4-diethylthioxanthen-9-one)

<Polymerization Inhibitor>

MEHQ (trade name, "p-methoxyphenol", manufactured by Kanto Chemical Co., Inc., hydroquinone monomethyl ether)

<Slipping Agent>

BYK-UV3500 (manufactured by BYK Additives & Instruments GmbH, polyether-modified silicone containing acryloyl group)

In Table 1, "content of monofunctional monomer with respect to total mass of polymerizable compound" denotes the ratio (% by mass) of the content of the monofunctional monomer to the total content of the polymerizable compound.

7.2. Evaluation Method 7.2.1. Preparation of Recorded Material

A sample for evaluating color unevenness was prepared using an ink jet printer "PX-G5000" (product name, manufactured by Seiko Epson Corporation). A solid pattern image, that is, an image with a dot generation amount of 100% was printed on a PET film "BONSET" (product name, manufactured by C.I. Takiron Corporation) serving as a recording medium at room temperature and normal pressure under conditions of a recording resolution of 600 dpi×600 dpi and a liquid droplet weight of 20 ng, thereby obtaining a printing sample having a film thickness of 10 μm. Further, the solid pattern image is an image in which dots are recorded for all pixels which are defined as minimum recording unit regions based on the recording resolution. The sample was irradiated with ultraviolet rays from a UV-LED in an ultraviolet irradiation device mounted on a side of a carriage while the printing was performed, thereby obtaining a recorded material in which a cured film of the ink composition with a film thickness of 10 μm was formed on the recording medium.

Recorded materials having cured films formed on the recording medium with different film thicknesses were prepared in the same manner as described above except that the dot generation amount was changed. Specifically, a recorded material on which a cured film having a film thickness of 5 μm was formed was prepared by setting the dot generation amount to 50% and a recorded material on which a cured film having a film thickness of 20 μm was formed was prepared by setting the dot generation amount to 200%.

7.2.2. Packaging of Packaged Object

Each of the recorded materials obtained in the above-described manner was rounded such that the cured film was positioned inside and processed into a cylindrical shape. The recorded material was disposed in the periphery of a container (glass bottle) serving as the packaged object that had been preheated in a constant-temperature tank, allowed to stand in the constant-temperature tank at 90° C. for 10 seconds so that the recorded material was shrunk, and brought into close contact with the container.

The shrinkage ratio can be defined by Formula (2) shown below. In the present example, the shrinkage ratio was set to two levels of 40% (first region) and 10% (second region). Further, the shrinkage ratio of the recorded material was adjusted by changing the length of the recorded material having a cylindrical shape in the circumferential direction with respect to the outer circumference of the container serving as the packaged object.

Shrinkage ratio (%)=(length before shrinkage−length after shrinkage)/length before shrinkage (2)

7.2.3. Evaluation of Color Unevenness

In combinations of the inks and the film thicknesses of the cured films listed in Table 2, the optical density (OD) value after the shrinkage was measured in each of a case where the recorded material was shrunk at a shrinkage ratio of 40% (first region) and a case where the recorded material was shrunk at a shrinkage ratio of 10% (second region). A difference in OD value was acquired by Equation (3) shown below. The evaluation was performed based on the difference in OD value according to the following evaluation criteria, and the results are listed in Table 2.

[Math. 1]

$$\text{Difference in } OD \text{ value} = \frac{OD\ value_L - OD\ value_S}{OD\ value_S} \times 100 \quad (3)$$

(Here, the OD $value_L$ represents the OD value of the first region after the shrinkage or a larger value between the OD value of the first region and the OD value of the second region, and OD values represents the OD value of the first region after the shrinkage or a smaller value between the OD value of the first region and the OD value of the second region.)

Evaluation Criteria

A: The difference in OD value was 5% or less.

B: The difference in OD value was greater than 5% and 10% or less.

C: The difference in OD value was greater than 10% and 20% or less.

D: The difference in OD value was greater than 20%.

7.2.4. Evaluation of Wrinkles

In the packaging of the packaged object described above, the situation of wrinkles generated after the shrinkage was visually observed, and the evaluation was performed according to the following evaluation criteria. The results are listed in Table 2.

Evaluation Criteria

A: Wrinkles generated on the cured film were not found.

B: A small amount of wrinkles generated on the cured film were found.

C: Large wrinkles generated on the cured film were found.

7.2.5. Evaluation of Blocking

In the package of the packaged object described above, the presence or absence of attachment was evaluated by visually observing the recorded material which had been shrunk and brought into close contact with the packaged object whether marks of the cured film attached to the container had been transferred, and determination was made according to the following evaluation criteria.

Evaluation Criteria

A: Attachment of the cured film to the container was not observed.

B: Attachment of the cured film to the container was slightly observed.

C: Attachment of the cured film to the container was observed.

TABLE 2

| | | First region | | Second region | | | | | |
|---|---|---|---|---|---|---|---|---|---|
| | Ink | Film thickness (μm) | Shrinkage ratio (%) | Film thickness (μm) | Shrinkage ratio (%) | Evaluation of color unevenness | Evaluation of wrinkles First region | Evaluation of wrinkles Second region | Evaluation of blocking |
| Example 1 | Ink 1 | 5 | 40 | 10 | 10 | B | C | A | A |
| Example 2 | Ink 2 | 5 | 40 | 10 | 10 | A | B | A | B |
| Example 3 | Ink 3 | 5 | 40 | 10 | 10 | A | A | A | B |
| Example 4 | Ink 3 | 10 | 40 | 20 | 10 | A | A | B | B |
| Example 5 | Ink 4 | 5 | 40 | 10 | 10 | B | A | A | C |
| Example 6 | Ink 5 | 5 | 40 | 10 | 10 | A | A | A | C |
| Comparative Example 1 | Ink 1 | 5 | 40 | 5 | 10 | D | C | A | A |
| Comparative Example 2 | Ink 2 | 5 | 40 | 5 | 10 | C | B | A | B |
| Comparative Example 3 | Ink 3 | 5 | 40 | 5 | 10 | C | B | A | B |
| Comparative Example 4 | Ink 4 | 5 | 40 | 5 | 10 | C | A | A | C |
| Comparative Example 5 | Ink 5 | 5 | 40 | 5 | 10 | C | A | A | C |

7.3. Evaluation Results

The evaluation results are listed in Table 2. In Examples 1 to 6 in which a cured film having a film thickness less than the film thickness of a cured film formed in the second region at a shrinkage ratio of 10% was formed in the first region at a shrinkage ratio of 40%, the obtained results of evaluation of color unevenness were satisfactory. However, Comparative Examples 1 to 5 in which cured films having the same film thickness were respectively formed in the first region and the second region, the results of the evaluation of color unevenness were not satisfactory.

In the evaluation of wrinkles, satisfactory results were confirmed in a case of the ink containing 69% by mass to 76% by mass of the monofunctional monomer with respect to the total mass of the polymerizable compound.

That is, in Examples 3, 5, and 6 and Comparative Examples 3 to 5, the inks 3 to 5 were used, and the film thicknesses of the cured films were 5 μm and 10 μm and the shrinkage ratios were 10% or the film thicknesses of the cured films were 5 μm or 10 μm and the shrinkage ratios were 40%, generation of wrinkles was not found in both cases, and satisfactory results were shown. The reason for this is considered to be that since the ink composition contained a large amount of the monofunctional monomer with respect to the total mass of the polymerizable compound, a flexible cured film was able to be formed, and the cured film was also shrunk along with the shrinkage of the recording medium when the recorded material was shrunk.

However, wrinkles were slightly found on the cured film when the cured film having a film thickness of 20 μm of Example 4 was shrunk at a shrinkage ratio of 10%. The reason for this is considered to be that since the cured film was 20 μm, which was thick, the flexibility of the cured film was lost, the cured film was peeled off from the recording medium during the shrinkage, and thus wrinkles were generated.

There was a tendency that the evaluation results of blocking were preferable in a case of the ink composition containing a small content of the monofunctional monomer with respect to the total mass of the polymerizable compound. That is, it was found that the ink 1 used in Example 1 and Comparative Example 1, containing 70% by mass or less of the monofunctional monomer with respect to the total mass of the polymerizable compound showed satisfactory results in the evaluation of blocking.

What is claimed is:

1. An ink jet recording method comprising:

a jetting step of jetting a radiation-curable ink jet composition containing a coloring material and a polymerizable composition to adhere to a recording medium that shrinks when heated; and a curing step of curing the radiation-curable ink jet composition by irradiating the radiation-curable ink jet composition adhered to the recording medium with radiation, to obtain a recorded material, wherein the recorded material has a first region and a second region where shrinkage ratios due to the heating in a main surface direction are different when the recorded material is shrunk by being heated and brought into close contact with a packaged object, the shrinkage ratio of the first region in the main surface direction is greater than the shrinkage ratio of the second region in the main surface direction, and the radiation-curable ink jet composition adheres to the recording medium in the jetting step such that a film thickness of a cured film formed in the first region is less than a film thickness of a cured film formed in the second region.

2. The ink jet recording method according to claim 1, wherein a maximum film thickness of the cured film is 10 μm or less.

3. The ink jet recording method according to claim 1, wherein the radiation-curable ink jet composition contains a monofunctional monomer as the polymerizable compound, and a content of the monofunctional monomer is 40% by mass or greater and 85% by mass or less with respect to a total mass of the polymerizable compound contained in the radiation-curable ink jet composition.

4. The ink jet recording method according to claim 1, wherein the radiation-curable ink jet composition contains a non-white coloring material as the coloring material.

5. The ink jet recording method according to claim 1, wherein the recording medium is any of a polyethylene terephthalate film or a polyolefin film.

6. A method of packaging a packaged object, comprising:

disposing the recorded material obtained by the ink jet recording method according to claim 1 in a periphery of a packaged object; and heating the recorded material to shrink the recorded material.

* * * * *